Nov. 3, 1959 C. S. WARREN 2,911,631

MAGNETIC MEMORY SYSTEMS

Filed June 27, 1958 3 Sheets-Sheet 1

INVENTOR.
CHARLES S. WARREN
BY Morris B. Pabkin
ATTORNEY

Nov. 3, 1959 C. S. WARREN 2,911,631

MAGNETIC MEMORY SYSTEMS

Filed June 27, 1958 3 Sheets-Sheet 2

INVENTOR.
CHARLES S. WARREN
BY
Morris Rabkin
ATTORNEY

Nov. 3, 1959 C. S. WARREN 2,911,631

MAGNETIC MEMORY SYSTEMS

Filed June 27, 1958 3 Sheets-Sheet 3

INVENTOR.
CHARLES S. WARREN
BY Morris [signature]
ATTORNEY

United States Patent Office 2,911,631

Patented Nov. 3, 1959

2,911,631

MAGNETIC MEMORY SYSTEMS

Charles S. Warren, Haddon Heights, N.J., assignor to Radio Corporation of America, a corporation of Delaware Application June 27, 1958, Serial No. 744,990

18 Claims. (Cl. 340—174)

This invention relates to memory systems, and particularly to magnetic memory systems.

Magnetic memory systems provide a relatively inexpensive, high-speed, random access storage means for use in storing encoded information. Rectangular hysteresis loop magnetic material is used for the storage medium. The two states "1" and "0" of a binary information signal are respectively represented by the positive (P) and negative (N) states of magnetization of the material. Certain prior memories are of the coincident-current type wherein a desired memory element of an array of memory elements is selected by means of two "half-excitation" selecting currents.

Because practical materials do not exhibit a perfectly rectangular hysteresis loop, each "half-selected" element has some "undesired" flux change which induces a "noise" voltage in the common sensing winding. The cumulative effect of the "noise" voltages tends to mask the desired output signal. In relatively large memories, the "noise" problem is severe and the cumulative "noise" voltage may be larger in amplitude than the desired output voltage. Certain known techniques, such as a "checkerboard" sensing winding, have been used successfully to reduce the "noise".

A separate inhibit winding is also used in coincident-current type memories to provide advantages in using a common address for a plurality of stacked arrays; in using a standard drive program for both "1" and "0" digits, etc. Separate windings are used in prior coincident current memories for performing the sensing and inhibiting functions because these windings are linked in different senses to the magnetic elements. Thus, the sensing winding is linked to one half the elements in one sense and to the other half of the elements in the opposite sense with respect to the selecting lines, while the inhibit winding links any one element in the sense opposite that of the selecting lines. By the present invention, the necessity for separate sense and inhibit windings is avoided, yet the sensing and inhibit functions are performed in a manner equal to or superior than the performance of these functions in prior magnetic memories of similar type.

It is an object of the present invention to provide improved magnetic memories of the coincident type.

Another object of the present invention is to provide improved magnetic memories of the coincident type which is simpler in construction than prior memories of similar type.

A further object of the present invention is to provide an improved magnetic memory of the coincident type using a single winding to perform both sensing and inhibit functions.

According to the present invention, a plurality of magnetic elements is divided into groups by windings each linking all the elements in a different group. Certain of these windings are connected in series with each other to the first input of a sensing means. The remaining ones of the windings are connected in series with each other to the second input of the sensing means. A suitable sensing means is a difference amplifier. During a read operation, one binary digit is indicated by a relatively large amplitude signal from the difference amplifier. The absence of a signal from the difference amplifier indicates the other binary digit. Inhibit signals are applied to all the windings when writing the other binary digit into the array.

A feature of the invention resides in the provision of the above-mentioned windings as printed on an apertured plate of magnetic material.

Figure 1:
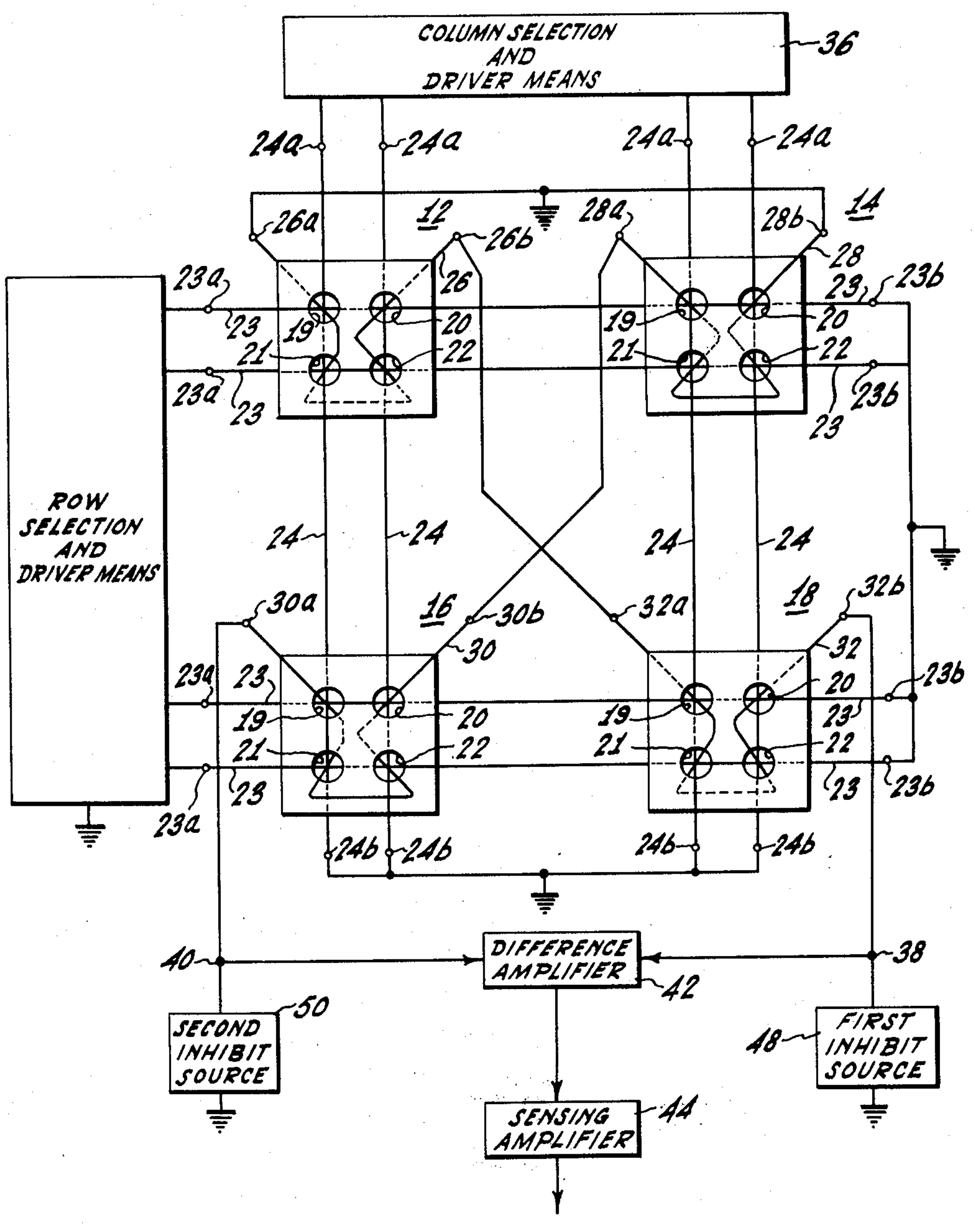
Fig. 1 is a schematic diagram of a memory system according to the invention.

The memory system of Fig. 1, has, for example, four separate arrays 12, 14, 16 and 18 of magnetic memory elements. Each of the arrays may be two-dimensional arrays of individual toroidal cores, or a single apertured plate of rectangular hysteresis loop magnetic material. An article by J. A. Rajchman published in the March 1957 Proceedings of the I.R.E. describes such apertured plates. In using apertured plates, each memory element consists of the portion of magnetic material surrounding a different aperture. For convenience of drawing, each of the plates is shown to have a 2 x 2 matrix of memory elements 19, 20, 21 and 22, respectively. A set of four row lines 23 is linked to each different row of the memory elements, and a set of four column lines 24 is linked to each different column of memory elements. A separate winding 26, 28, 30 and 32 for both sensing and inhibiting is linked to all the elements 19–22 of the respective arrays 12, 14, 16 and 18. Hereinafter this separate winding is referred to as an "inhibit" winding. The manner of linking the row, column, and inhibit windings of any one array to the memory elements 19–22 of that array is described in the aforementioned Rajchman article. The pair of row lines 23 of the upper row of arrays 12 and 14 link correspondingly located ones of the memory elements 19–22 in mutually opposite senses. Thus, the uppermost row line 23 links the element 19 of the array 12 in one sense, with respect to the row line terminal 23_a_, and the element 19 of the array 14 in the opposite sense. Similarly, the pair of row lines 23 of the lower row of arrays 16 and 18 link correspondingly located ones of the memory elements 19–22. The column lines 24 also link correspondingly located ones of the memory elements 19–22 of the first and second columns 12, 16 and 14, 18 of the memory arrays. The four row lines 23 are all connected at their end terminals 23_a_ to four outputs of a row selection and driver means 34. The four column lines 24 are all connected at their terminals 24_a_ to four outputs of a column selection and driver means 36. The end terminals 23_b_ and 24_b_ of the row and column lines 23 and 24 are connected to a common point of reference potential, indicated in the drawing by the conventional ground symbol.

The inhibit winding of any one array is linked to successive ones of the elements 19–22 in successively opposite senses. Thus, half the elements 19–22 of any array are linked by an inhibit winding in one sense, and the other half of the elements 19–22 of the same array are linked in the opposite sense by the same inhibit winding. The pair of inhibit windings 26, 32 of the diagonally opposite arrays 12, 18 are connected in series with each other between a first common junction 38 and ground. The pair of inhibit windings 28, 30 of the other diagonally opposite arrays 14, 16 are connected in series with each other between a second common junction 40 and ground. The two common junctions 38 and 40 are connected respectively to two inputs of a difference amplifier 42. The output of the difference amplifier 42 is connected to the input of a sensing amplifier 44. An indication of the information stored in the memory system is provided at the output terminal 46 of the sensing amplifier 44. First and second inhibit sources 48 and 50 are connected to the first and second common junctions 34 and 40, respectively.

The row and column selection means 34, 36, the difference and sensing amplifiers 42, 44 and the inhibit sources 48, 50 are all well-known units in the art. The row and column selection and driver means 34 and 37 each operate to apply coincident-current read pulses to a selected one row line 23 and a selected one column line 24. The coincident read pulses set the one of the memory elements 19–22 linked by both selected lines to one of two remanent states, say the state "P" corresponding to a binary "0" digit. Each of the other of the memory elements 19–22 linked by only one of the selected lines is partially driven towards saturation in the P state. These partially selected memory elements are referred to in the art as "half-selected" elements.

During a write operation, the row and column selection and driver means 34 and 36 apply coincident write pulses to a selected row and column line 23 and 24. The write pulses are of opposite polarity from the read pulses and set the selected one of the memory elements 19–22 to the other of its remanent states, the state "N" corresponding to a binary "1" digit. If it is desired to keep the selected memory element in the state P (corresponding to a binary "0"), an inhibit current is applied to all the inhibit windings during the write operation. The inhibit current effectively cancels one of the write pulses, and, therefore, the other write pulse alone cannot change the selected memory elements from the state P to the state N. Following each write operation, a so-called "post disturb" pulse may be applied to all the memory elements 19–22. The "post disturb" pulse is advantageous in tending to establish all the memory elements in standard remanent conditions in either one or the other of the states P and N. Any suitable means such as the logic control unit of a digital computer may be used to generate and apply the various signals used in operating the memory system.

Consider, now, the operation of the system of Fig. 1 when the memory element 19 of the first array 12 is selected for reading. The first row and column lines 23 and 24 select the array 12 element 19, half-select the array 12 elements 20 and 21, half-select the array 14 elements 19 and 20, and half-select the array 16 elements 19 and 21. The net signal induced in the array 12 inhibit winding 26 is made up of the desired signal from the selected element 19 and the two "noise" signals from the two half-selected elements 20 and 21. Because of the "checkerboard" linkage to the inhibit winding 26, the two "noise" signals ($n1$) are in a direction to aid the desired signal. The net output signal is of a relatively large amplitude when the selected element 19 is in the state N and is of relatively small amplitude when the selected element 19 is already in the state P.

The different amplitudes result because the selected element 19 produces a much larger signal in changing from the state N to the state P than when the selected element stays in the state P. This net output signal then corresponds to that obained by a conventional two-dimensional coincident-current array. No signals are induced in the array 18 inhibit winding 32 which is series connected to the array 12 inhibit winding 26. Thus, a relatively high potential (S) is applied to the common junction 38 when the selected element 19 is in the state N, and a relatively low potential ($s$) is applied to the common junction 38 when the selected element is already in the state P prior to a read operation. The two noise signals induced in the array 14 sensing winding 28 also are in a direction to aid each other, as are the two noise signals induced in the array 16 sensing winding 30. Thus, the "noise" signals from the arrays 14 and 16 apply a net noise signal ($n2$) of relatively low potential to the other common junction 40.

The signal $(A-B)$ amplified by the difference amplifier 42 can be expressed by the following equation, where A represents the potential at the common junction 38, and B represents the potential at the other common junction 40.

$$A-B=(S+n1)-n2 \tag{1}$$

If the selected element is in one of the other diagonally opposite pairs of planes Equation 1 becomes, $$A-B=n1-(S+n2) \tag{2}$$

If the selected element is in one of the arrays 12, 18, and if the state of the selected element is changed, then the difference $(A-B)$ is of one polarity and is relatively large (Equation 1). If the selected element is in one of the arrays 14, 16 and if the state of the selected element is changed, then the difference $(A-B)$ is of the other polarity and is relatively large (Equation 2). If the state of the selected element is not changed, then the difference signal is of relatively small amplitude, say 10 or more times smaller than the larger signal. Thus, a relatively large or a relatively small signal is applied to the sensing amplifier 44 by the difference amplifier 42 depending upon the state of the selected memory element. The sensing amplifier 44 is suitably biased to respond only to a relatively large amplitude signal.

During the write operation both of the inhibit sources 48, 50 are activated to apply inhibit currents to the pairs of inhibit windings in writing (or rewriting) a binary "0" digit into a selected memory element. Beginning at the common junction 38, the inhibit current from the first inhibit source 48 flows in the pair of inhibit windings 32 and 26 in a direction to oppose any write current flowing in the row and column windings 23 and 24 of the arrays 12 and 18. Similarly, beginning at the other common junction 40, the inhibit current from the second inhibit source 50 opposes any write current applied to the arrays 14 and 16. Neither of the inhibit sources 48 and 50 is activated in writing (or rewriting) a binary "1" digit into a selected memory element. Accordingly, the single winding on each of the arrays serves both functions of sensing and inhibiting.

Figure 2:
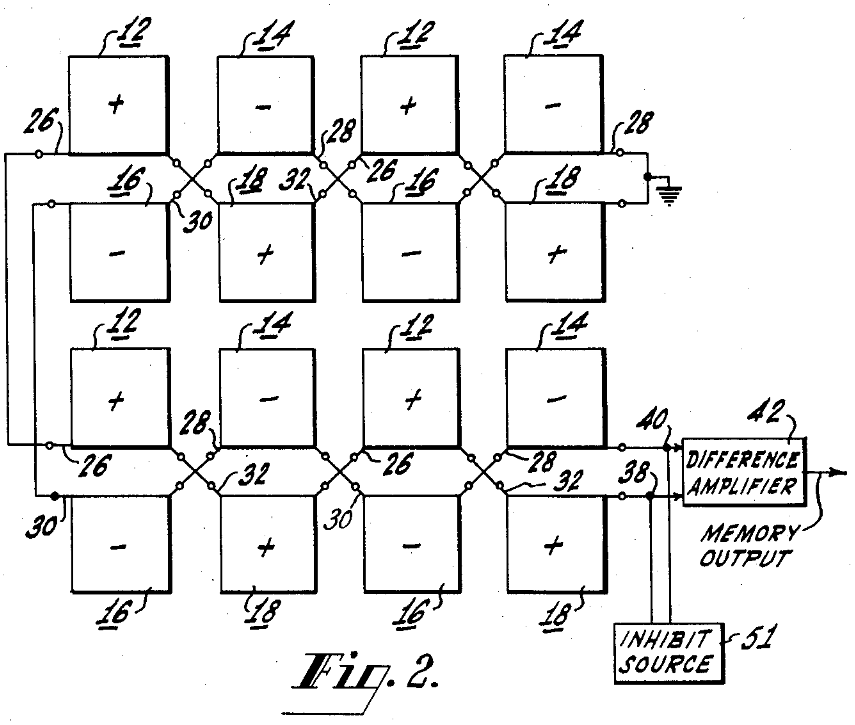
Fig. 2 is a schematic diagram of another embodiment of a memory system according to the invention using a 4 x 4 array of memory planes.

A larger two-dimensional memory system can be made by connecting the inhibit windings of a plurality of the systems of Fig. 1 in series as shown in Fig. 2 for a system having a 4 x 4 array of memory matrices. For convenience of drawing, the row and column windings and their auxiliary equipment are omitted. In Fig. 2, the sixteen sensing windings are divided into two groups. The first group includes the sensing windings 26 and 32 connected in series with each other between the first common junction 38 and ground. The second group includes the sensing windings 28 and 30 connected in series with each other between the second common junction 40 and ground. The difference amplifier 42 is connected across the common junctions 38, 40 as is an inhibit source 51. The source 51 is used to provide a pair of inhibit currents to the pairs 26, 32 and 28, 30 of inhibit windings.

The operation of the system of Fig. 2 is similar to that described for the system of Fig. 1. The + and − signs in the various arrays are used to indicate the polarity, positive or negative, of the difference signal ($A-B$) corresponding to the change from one state to the other state of a selected element in an array marked with a + or − sign (for example, from binary "1" to binary "0"). When the selected element does not change state during a read operation, the difference signal is of relatively small amplitude, and a relatively small amplitude output signal is produced by the difference amplifier 42 (indicating, in this example, a binary "zero"). New information may be written or the same information may be rewritten into a selected element by activating the inhibit source 51 to apply or not apply inhibit currents to all the inhibit windings in the manner described for the system of Fig. 1.

Figure 3:
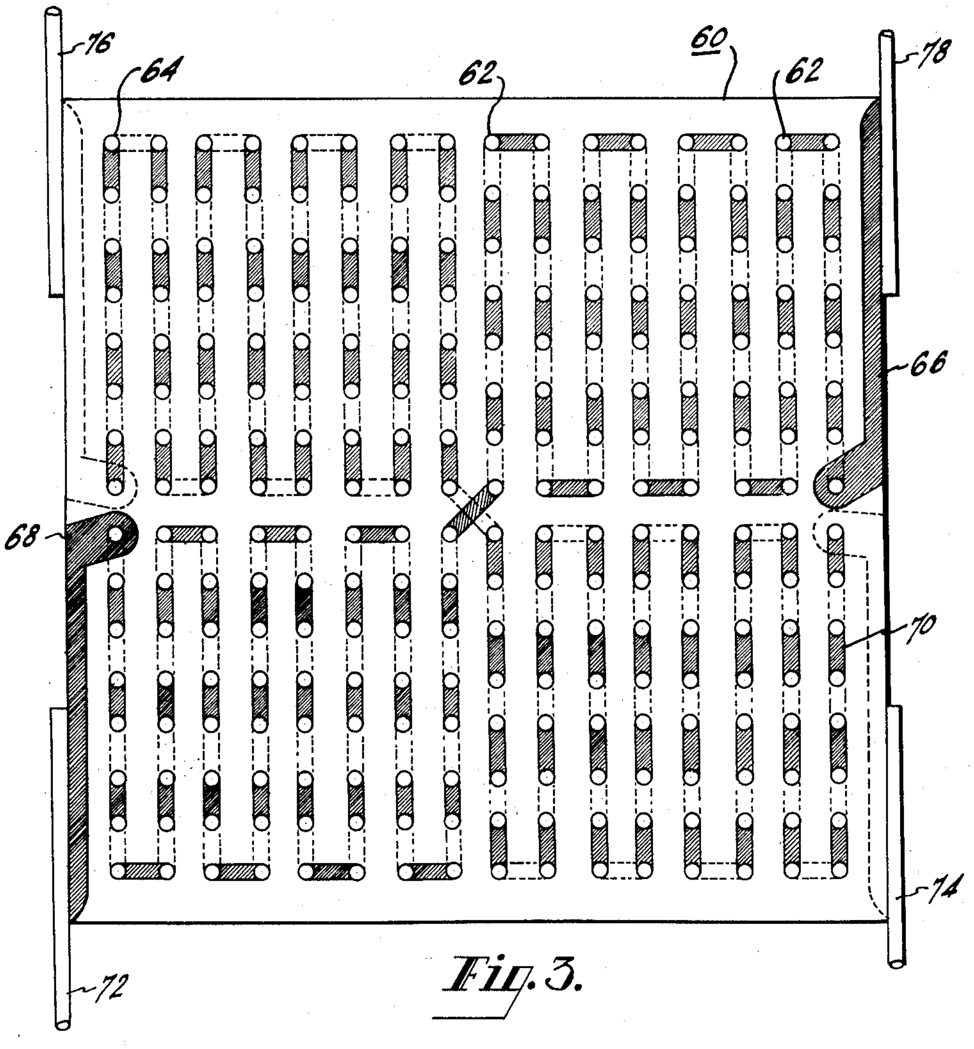
Fig. 3 is a schematic diagram of still another embodiment of the invention including an apertured plate of magnetic material having the windings printed thereon.

The separate inhibit windings may be placed on a single apertured plate as shown for the plate 60 of Fig. 3. The plate 60 of Fig. 3 has, for example, a 16 x 16 array of apertures 62. The apertures 62 are divided into four groups with each group being located in a different quandrant of the plate 60. A different one of four printed windings 64, 66, 68 and 70 links all the apertures 62 of each different group. The inhibit windings 64 and 70 of the second and fourth quandrants are connected in series with each other on the bottom surface of the plate 60, and the inhibit windings 66 and 68 of the first and third quandrants are connected in series with each other on the top surface of the plate 62. Connection to the two groups of inhibit windings are made by four terminal leads 72, 74, 76 and 78 soldered to the side portions of the plate 60. The terminal leads 72, 74 may be connected to the two inputs of a difference amplifier, and the other two terminal leads 76, 78 may be connected to ground, as shown in the embodiment of Fig. 1.

Figure 4:
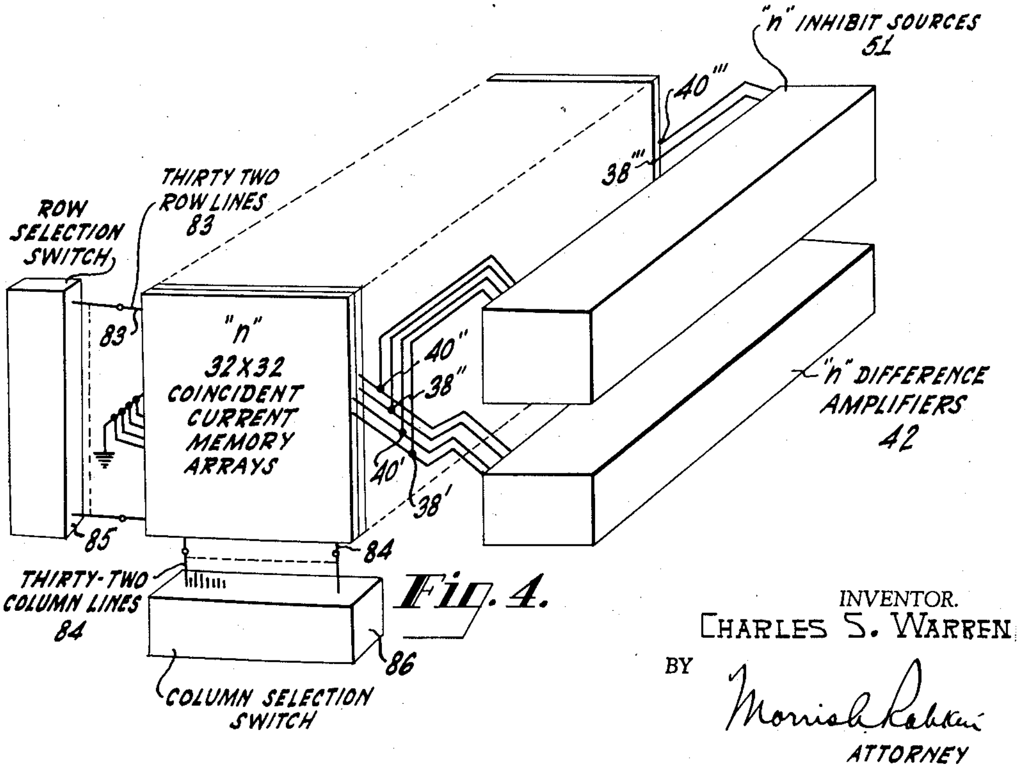
Fig. 4 is a schematic diagram of an embodiment of a three-dimensional memory system according to the invention.

A plurality of the plates 60 of Fig. 3, or a plurality of the arrays of Figs. 1 and 2 may be stacked together in the manner shown in Fig. 4 to form a three-dimensional memory array 80. For example, four of the plates 60 of Fig. 3 may be interconnected in the manner shown in Fig. 1 to form a 32 x 32 plane 82. A number "$n$" of the planes 82 may be stacked together with correspondingly located ones of the memory elements having their apertures aligned with each other. Thirty-two row lines 83 and thirty-two column lines 84 are then threaded back and forth through the thirty-two rows and columns of the memory elements from the front end to the back end of the stacked planes 82. The row lines 83 are connected to the outputs of a row selection switch 85, and the column lines 84 are connected to the outputs of a column selection switch 86. Each plane 82 has a separate one of "$n$" difference amplifiers 42, and a separate one of "$n$" inhibit sources 51 connected to the two groups of series-connected windings.

The operation of the memory array 80 is similar to that of conventional coincident-current memories with the exception that the two groups of series-connected inhibit windings in each plane 82 performs both the functions of sensing and inhibiting, as described above for the embodiments of Figs. 1 and 2.

There have been described herein improved coincident-current memory systems using a single winding for both sensing and inhibiting. The series-connected windings all may be printed on a single multi-apertured plate of magnetic material. The signals induced in the pair of inhibit windings are compared with each other and the resulting signal used to indicate the stored information. A relatively large amplitude resulting signal indicates one binary digit and a relatively small amplitude resulting signal indicates the other binary digit. A difference amplifier provides a suitable means for taking the output signal. Other means for taking the output signal will be apparent to those skilled in the art.

What is claimed is:

1. In a magnetic memory system, the combination comprising a plurality of magnetic elements of rectangular hysteresis loop material, a first winding linking certain of said element in successively opposite senses, a second winding linking the remaining ones of the elements in successively opposite senses, and a sensing means having first and second inputs respectively connected to said first and second windings.

2. In a magnetic memory system, the combination comprising a plurality of magnetic elements of substantially rectangular hysteresis loop material, four windings dividing said elements into four quarters, said windings being connected in series with each other in pairs in two series circuits having end terminals, said series circuits being connected together at one of their said end terminals, and a sensing means having first and second inputs respectively connected to another of said end terminals of said series circuits.

3. In a magnetic memory system, the combination as claimed in claim 2 wherein said magnetic elements are individual magnetic cores.

4. In a magnetic memory system, the combination as claimed in claim 2 wherein said magnetic elements are in and a part of an apertured plate of substantially rectangular hysteresis loop material.

5. In a magnetic memory system, the combination as claimed in claim 4 wherein said windings are made of conductive material printed on said apertured plate.

6. In a magnetic memory system, the combination comprising a plurality of magnetic elements each having two remanent states, means for writing information into a desired one of said elements comprising means for applying to said desired element a net excitation sufficient to change said desired element from one to the other of said states, means for reading information stored in said desired element comprising means for applying to said desired element a net excitation sufficient to change said desired element from said other to said one state, a pair of windings, one of said pair linking certain of said elements including said desired element and the other winding of said pair linking the remaining ones of said elements, means for taking the difference between the signals induced in said one and other windings during a reading operation, and means for selectively applying excitations to both windings of said pair during a writing operation whereby said net writing excitation is insufficient to change said desired element from said other to said one state.

7. In a magnetic memory system, the combination comprising a plurality of magnetic elements of substantially rectangular hysteresis loop material, first and second sets of windings linked to said elements for selectively writing binary information into and reading information out of said elements, and third and fourth windings dividing said elements into two groups, a writing signal being applied to both said third and fourth windings when one binary digit is written during said writing of information, and a difference signal being supplied by said third and fourth windings during said reading.

8. In a magnetic memory system, the combination as claimed in claim 7 wherein said elements are in and a part of an apertured plate of said material, and wherein said third and fourth windings are made of a conductive material printed on said plate.

9. In a magnetic memory system, the combination of a plurality of magnetic elements of substantially rectangular hysteresis loop material, first and second sets of selecting lines linked to said elements for writing information into and reading information out of said elements, a plurality of other windings linked to said elements, each said element being linked by a different line of said first set, a different line of said second set and a different one of said other windings, said other windings being connected in two groups with each said group including one or more of said plurality of windings connected in series with each other, said other winding groups operating in both said writing and reading of information.

10. In a magnetic memory system, the combination as claimed in claim 9 including a difference amplifier having two inputs, said two groups of windings respectively connected across a different one of said inputs.

11. In a magnetic memory system, the combination comprising a plurality of arrays of magnetic elements of substantially rectangular hysteresis loop material, each of said arrays being arranged in rows and columns, the elements of any one array being aligned with corresponding elements of all the other arrays, a set of row lines each linking a different aligned row in each array, a set of column lines each linking a different aligned column in each array, the elements of each of said arrays being divided into at least two groups by an even number of inhibit windings, a plurality of sensing means each having two inputs respectively connected to the said two groups of windings of a different one of said arrays, and a plurality of inhibit means each having two outputs respectively connected to the said two groups of windings of a different one of said arrays.

12. In a magnetic memory system, the combination as claimed in claim 11, said arrays each being a separate apertured plate of substantially rectangular hysteresis loop material.

13. In a magnetic memory system, first and second arrays of magnetic elements of rectangular hysteresis loop material, the elements of said arrays being arranged in rows and columns, first and second sets of selecting lines, each pair of one first and one second selecting line being individual to a different one of said elements, a first winding linking all the elements in the first of said arrays in checkerboard fashion, a second winding linking all the elements in said second array in checkerboard fashion, sensing means having two inputs respectively connected to said first and second windings, and inhibit means having two outputs respectively connected to said first and second windings.

14. In a magnetic memory system, the combination of a number of groups of magnetic elements of substanstantially rectangular hysteresis loop material, separate windings each linking all the elements in each different one of said groups, first, second and third common terminals, certain of said separate windings being connected in series with each other between said first and second common terminals, and the others of said separate windings being connected in series with each other between said first and third common terminals.

15. In a magnetic memory system, the combination as claimed in claim 14 including sensing means connected across said second and third common terminals.

16. In a magnetic memory system, the combination as claimed in claim 14, including inhibit means connected across said second and third common terminals.

17. In a magnetic memory system, the combination as claimed in claim 14 wherein said elements are in and a part of an apertured plate of substantially rectangular hysteresis loop material, and wherein said separate windings are each formed by a portion of a conductive coating on the surfaces of said plate and the inside walls of said apertures.

18. In a magnetic memory system, the combination as claimed in claim 14, wherein said elements are individual cores.

No references cited.